(12) United States Patent
Rau et al.

(10) Patent No.: US 6,560,464 B1
(45) Date of Patent: May 6, 2003

(54) TELEPHONE SWITCHING SYSTEM AND METHOD

(75) Inventors: Helmut Rau, Germering (DE); Udo Klotz, Neuried (DE); Franz Egger, Munich (DE); Bernd Schneider, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/441,160

(22) Filed: Nov. 15, 1999

(30) Foreign Application Priority Data

Nov. 16, 1998 (DE) ......................................... 198 52 774

(51) Int. Cl.⁷ ............................................. H04B 1/38
(52) U.S. Cl. ..................... 455/554; 455/3.01; 455/41; 455/414; 455/555; 455/560; 379/92.03; 379/156; 379/219
(58) Field of Search ......................... 379/92.03, 121.01, 379/156, 157–166, 219, 220.01–241; 455/456, 414–417, 507, 554, 555, 560, 3.01, 41

(56) References Cited

U.S. PATENT DOCUMENTS

| | | | |
|---|---|---|---|
| 4,802,199 A | 1/1989 | Lange et al. | 379/216.01 |
| 5,247,571 A | 9/1993 | Kay et al. | 370/385 |
| 5,422,941 A | 6/1995 | Hasenauer et al. | 379/114.29 |
| 5,517,562 A * | 5/1996 | McConnell | 379/201.03 |
| 5,539,817 A | 7/1996 | Wilkes | 370/410 |
| 5,758,281 A | 5/1998 | Emery et al. | |
| 5,841,854 A | 11/1998 | Schumacher et al. | 379/224 |
| 5,892,821 A | 4/1999 | Turner | 379/207.15 |
| 5,920,619 A | 7/1999 | Karppinen | 379/220.01 |
| 6,011,975 A | 1/2000 | Emery et al. | 379/230 |
| 6,101,242 A * | 8/2000 | McAllister et al. | 379/201.02 |
| 6,115,412 A | 9/2000 | Vanderpool | 375/130 |
| 6,259,782 B1 | 7/2001 | Gallant | 379/219 |
| 6,356,756 B1 | 3/2002 | Koster | 379/221.02 |

FOREIGN PATENT DOCUMENTS

WO    WO 97/34437    9/1997    ............ H04Q/7/38

OTHER PUBLICATIONS

"FMC– What Belongs Together is Now Growing Together" I. Willimowski, Berlin 48 (1998) English Translation of German Text.
"Multifunctional Switching for Hybrid Fixed/Mobile Communication Networks", M. Ruvoen et al. English Translation of German Text.
Ruvoen M. et al: Multifunktionale Vermittlung fur Hybride Fest–/Mobilfunknetze, Alcatel Telecom Rundschau, 3. Quartal 1997, pp. 194–199.
Willimowski I.: FMC–jetzt wachst zusammen, was zusammengehort, IK Heft 3, May/Jun. 1998, pp. 32–35.
"FMC– What Belongs Together is Now Growing Together" I. Willimowski, Berlin 48 (1998) English Translation of German Text.
"Multifuntional Switching for Hybrid Fixed/Mobile Communication Networks", M. Ruvoen et al. English Translation of German Text.

* cited by examiner

Primary Examiner—Thanh Cong Le
Assistant Examiner—Stephen D'Agosta
(74) Attorney, Agent, or Firm—Shaw Pittman LLP

(57) ABSTRACT

A telephone switching system and method for switching CENTREX (CTX) calls between CTX subscribers, is provided in which the CTX subscribers comprise mobile subscribers and wired subscribers. A message interface for the transmission of CTX-specific information is established between the mobile switching center allocated to the mobile subscribers and the fixed network switching center allocated to the wired CTX subscribers, and the control of the mobile switching center is supplemented by a control part for the CTX-specific mobile call processing.

23 Claims, 8 Drawing Sheets

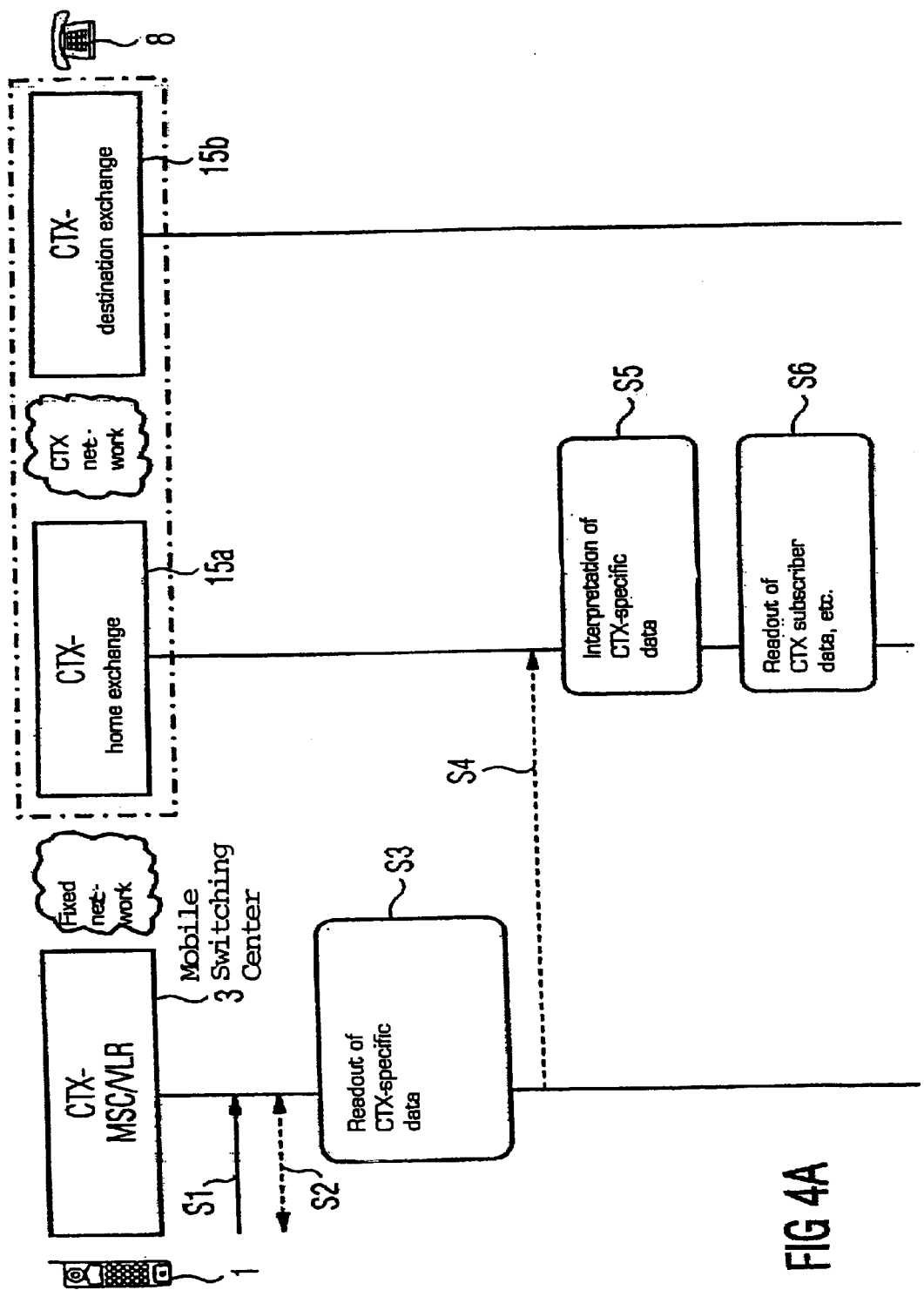

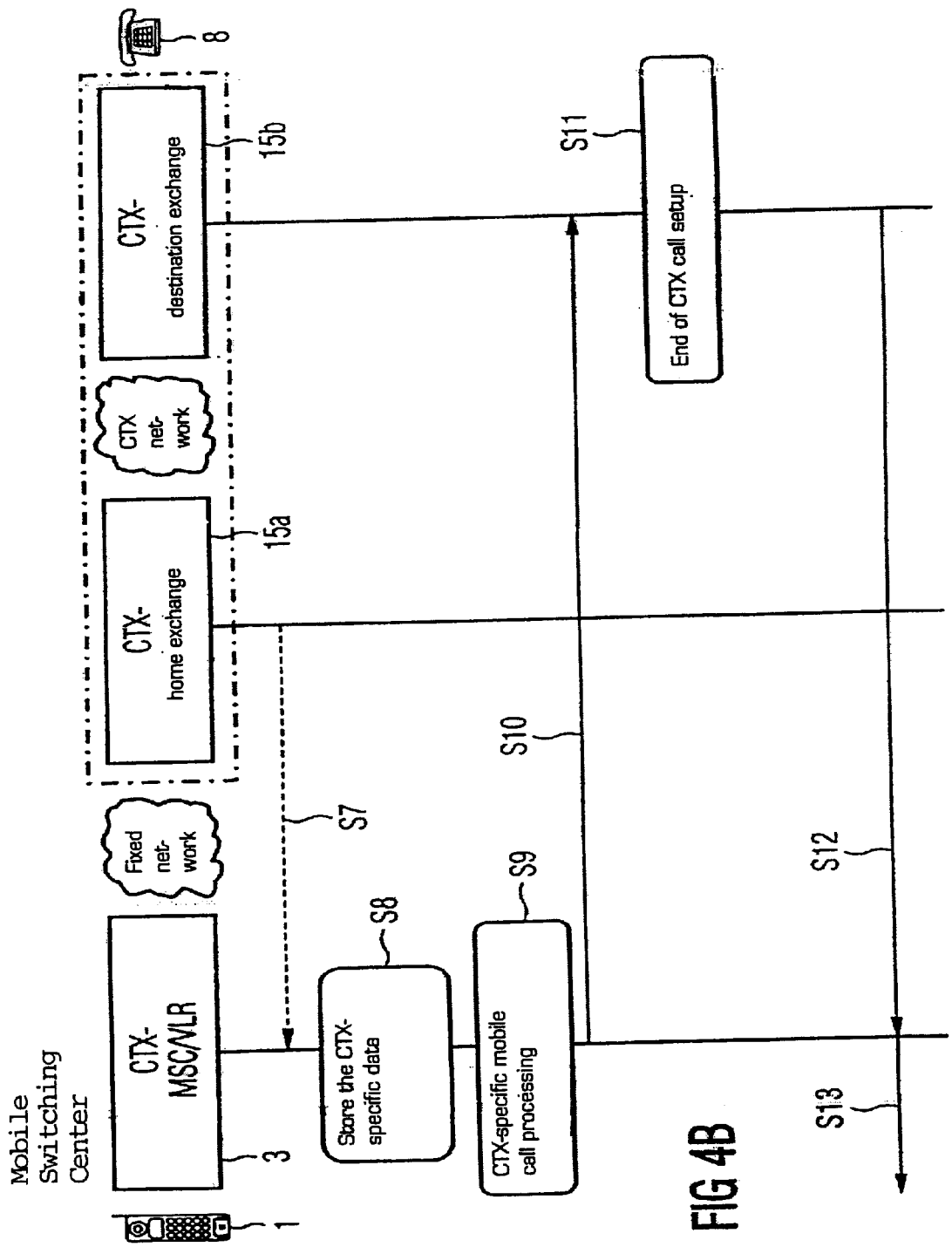

TELEPHONE SWITCHING SYSTEM AND METHOD

BACKGROUND OF THE INVENTION

1. Field of the Invention

The present invention is directed to a telephone switching system, particularly a CENTREX (CTX) telephone switching system, in which CTX connections or CTX calls can be setup between defined CTX subscribers.

2. Description of the Related Art

CENTREX systems are purely software solutions that implement private branch exchanges connected to the public telephone network. CENTREX (CTX) groups can be used to replace hardware-implemented private branch exchanges (PBX) within each fixed network exchange (local exchange LE) of the public telephone network (public switched telephone network, PSTN). The advantage of this software CTX solution is that it allows the telephone terminal equipment previously employed for realizing private branch exchanges to continue to be employed, allowing a flexible adaptation/modification of the individual CTX groups. The subscribers of a CTX group (CTX subscribers) are directly connected to the respective exchange but have the feeling of belonging to a private network.

Specific CTX functions are offered to the CTX subscribers of a CTX group for the setup of CTX connections or for the switching of CTX calls; these functions are essentially similar to those functions that a subscriber connected to a hardware implemented private branch exchange is accustomed to. These CTX functions can comprise a private telephone number plan for the CTX subscribers, the selection of an operator, call redirection, call forwarding, implementing the exit code for exiting into the public network, and other functions. Furthermore, CTX additions beyond the standard functions or features are conceivable, such as call redirection which may be dependent on whether a call is internal to the group or comes from outside the group or is dependent on traffic restrictions (for example, blocking for calls from or into the public telephone network).

The CTX groups of a plurality of switching centers can form an overlapping CTX private network. An expanded ISUP signaling between the affected switching centers is employed for the control of the CTX functions that are offered in order to be able to transmit control information, such as the type of call or other features or functions (e.g., blocking).

The right-hand section of FIG. 6 shows a simplified block circuit diagram of a known realization of a CTX system. In particular, FIG. 6 shows a fixed network exchange 15 to which a wired or stationary CTX subscriber 8 is connected, All information required for CTX call processing are deposited in a data bank. This data bank comprises a CTX-specific subscriber database 13 as well as a CTX-specific group database 14. Information about the CTX subscribers are deposited in the CTX-specific subscriber database, such as internal telephone numbers, external/public telephone numbers or CTX functions that are available to or, respectively, usable by the respective CTX subscribers.

Information about the individual CTX groups are stored in the CTX-specific group database 14, which contains; among other things, a group number plan or predetermined group functions deposited in it that are available for the subscribers of the respective CTX groups.

Additionally, a traditional database 12 is provided for depositing the standard fixed network information that are required for call switching via the respective switching center 15. This database 12 thus comprises generally public data, such as a number plan or a listing of the connected subscribers. A controller 9, which is expanded by a control unit 10 for CTX-specific call processing, is provided for processing calls to be switched via the switching center 15. This controller accesses the databases 12 through 14 via internal interfaces 11 in order to setup connections or to switch calls dependent on the information, stored in the respective database. In particular, the CTX control unit 10 accesses the two CTX-specific databases 13, 14 and is exclusively responsible for processing CTX calls.

The left-hand section of FIG. 6 shows a simplified block circuit diagram of a traditional mobile radio telephone system. A mobile radio telephone terminal equipment 1 communicates with a mobile radio telephone base station 2 (BS) that is allocated to a mobile switching center (MSC) 3 of a public mobile radio telephone network (public land mobile network PLMN). The mobile switching center 3 comprises a controller 4 for processing mobile radio telephone connections to the mobile terminal equipment 1. This controller 4 accesses a temporary database 6 in which information about mobile subscribers is deposited, via internal interfaces 5. This database comprises what is referred to as the visitor data file (visitor location register VLR) of the mobile switching center 3; it may be utilized in GSM mobile radio telephone networks for supporting subscriber mobility.

Additionally, a permanent database 7 is provided that likewise stores information of the mobile subscribers contains the home data file (home location register (HLR)) in GSM mobile radio telephone networks. The visitor data file is coupled to the home data file of the mobile switching center 3 in order to be able to unambiguously identify the momentary location of a mobile subscriber. A home data file in which the mobile subscriber is registered is allocated to each mobile subscriber 1.

When, however, the subscriber 1 is located outside the coverage area of the mobile switching center 3 allocated to him (e.g., when located abroad), it is determined that the corresponding mobile subscriber is not registered as a subscriber of the mobile switching center 3. This determination is made after initially contacting the corresponding mobile terminal equipment 1 with the base station 2 allocated to the mobile switching center 3. The mobile switching center having the corresponding home data file originally allocated to the mobile subscriber 1 is subsequently informed (via the fixed network) that the mobile subscriber is currently residing in the area of the new mobile switching center. Information that are necessary for encryption (among other things) are stored in the visitor data file of the new mobile switching center.

When the mobile subscriber 1 located outside the coverage area of his mobile switching center is called, a determination is made on the basis of the entry in his home data file that the called mobile subscriber is located in the area of the new mobile switching center and the connection is through-connected to him.

It can be particularly seen from the illustration of FIG. 6 that completely different executive sequences for call processing as well as databases were previously provided for mobile subscribers 1 and CTX subscribers 8. A parting wall that has not yet been satisfactorily overcome exists between the mobile radio telephone network shown at the left side and the fixed network with CTX subscribers shown at the right side, since mobile subscribers are not bound to a specific switching center, so that the CTX solution based on switching centers for a stationary CTX subscribers cannot be transferred without further effort to mobile CTX subscribers.

Although the field of intelligent network (IN) provides known solutions that combine wired or stationary subscribers with mobile subscribers, CTX functions can only be partially simulated utilizing such intelligent networks. A complete utilization of the entire scope of CTX functions, such as the billing according to reduced fee schedules for private networks, is not possible.

Additionally, a relatively complicated adaptation of the central TN network A element referred to as "service control point" (SCP) as well as an administration of the individual subscribers in the switching centers and this central IN network element is required given such IN solutions.

Furthermore, it is already known to forward calls from a CTX switching center, i.e., from the switching center 15 in FIG. 6, into the public mobile radio telephone network (PLMN).

The disadvantage of this method, however, is that this relates exclusively to call forwarding into the public mobile radio telephone network and does not additionally relate to the setup of connections in the opposite direction. This system can only be applied for the incoming reachability under the internal group telephone number and results in a detrimental call routing.

It follows from the above description that it has not formerly been possible to satisfactorily link mobile subscribers into a CTX group or into a CTX private network.

SUMMARY OF THE INVENTION

The present invention is therefore based on the object of allowing the involvement of mobile subscribers in CTX systems, particularly where the exchange-based CTX solution can continue to be employed for stationary CTX subscribers.

According to the present invention, this object is achieved by a telephone switching system comprising a CTX group that has wired CTX subscribers and mobile CTX subscribers, within which CTX connections can be setup, a database for storing CTX-specific data of these wired and mobile CTX subscribers, a fixed network switching center to which the wired CTX subscribers are allocated, where the fixed network switching center comprises a CTX-specific fixed controller for controlling the setup of a CTX connection via the fixed network switching center between a wired CTX subscriber and another CTX subscriber on the basis of CTX-specific data stored in the database, a mobile switching center to which the mobile CTX subscribers are allocated, which comprises a CTX-specific mobile controller for controlling the setup of a CTX connection between a mobile CTX subscriber and another CTX subscriber, and a data interface for the transmission of CTX-specific data between the fixed network switching center and the mobile switching center, where the data interface is comprised by elements of the fixed network switching center and the mobile switching center.

According to the present invention, a message interface for the transmission of CTX-specific information is established between the mobile switching center of the public mobile radio telephone network and the CTX fixed network switching center of the public telephone network, so that the CTX-specific databases of the CTX fixed network switching center can be made externally accessible for the mobile switching center.

Additionally, the controller of the mobile radio telephone switching center that is provided for the mobile call processing is supplemented by a CTX-specific controller that is provided for the CTX-specific mobile call processing. This CTX-specific controller of the mobile switching center can, for example, request CTX-specific information from the CTX fixed network switching center via the previously mentioned message interface, which are subsequently employed for the setup of a CTX connection between a mobile CTX subscriber and a further CTX subscriber of the corresponding CTX group. These CTX information can be requested and transmitted accompanying both a connection control as well as accompanying a location registration for the corresponding mobile CTX subscriber.

According to an exemplary embodiment of the present invention, the VLR part of the mobile switching center of the public mobile radio telephone network, i.e., the visitor data file of the mobile switching center, is supplemented by the possibility of accepting or of storing CTX-specific data. This VLR part thus serves as a temporary CTX-specific mobile subscriber database, so that the access to the CTX-specific data relevant for the mobile switching center can be accelerated. The acceptance of the data in the VLR part can likewise ensue accompanying the location registration at a new mobile switching center.

Furthermore, the HLR part of the public mobile radio telephone network, i.e., the home data file of the mobile switching center, can be supplemented by data that identify the affiliation of a mobile CTX subscriber to a CTX group. The HLR part in this case thus serves as permanent CTX-specific mobile subscriber database, whereby the data stored within serve as trigger for starting the CTX activities and for addressing the respectively responsible CTX fixed switching center. For starting the CTX activities, the CTX-specific data of the mobile subscribers deposited in the HLR part are loaded into the VLR part, this being accessed by the CTX-specific controller of the mobile switching center for setting up a CTX connection.

Real private branch exchanges, i.e., private branch exchanges realized in terms of hardware, can also be involved in the telephone number plan of CTX groups. An internal traffic with mobile subscribers in the same CTX private network is thus also possible for private branch exchange subscribers.

The advantage of the present invention is based on the idea that mobile subscribers can be simply classified into CTX groups or into a CTX private network, particularly where the mobile CTX subscribers are handled largely like wire-bound CTX subscribers in view of the establishment of the CTX group data and the CTX subscriber data. The CTX-specific databases in the CTX fixed network switching centers can also be employed largely unmodified for mobile CTX subscribers.

By contrast to the solution initially described employing intelligent networks, no additional network components are required in the present case, such as the SCP network element (given an intelligent network) being required in the participating networks (i.e., in the public mobile radio telephone network (PLMN) and the public fixed network (PSTN)).

The switching of CTX calls, i.e., the routing, can be optimized with the assistance of the present invention since outgoing connections for mobile CTX subscribers need not be routed via the CTX home switching center of the fixed network allocated to the mobile CTX subscriber. Standards that already exist such as, TCAP (transaction control application part), SCCP (signaling connection control part) or MTP (message transfer part), can continue to be used. The mobile radio standards only need to be slightly adapted, for example in view of the visitor data file (visitor location register VLR) or of the MAP (mobile application part).

In order to enhance the throughput of the inventive system, only the CTX-specific data that are actually required are transmitted via the above-described message interface into the public mobile radio telephone network or to the mobile switching center. These relevant CTX-specific data are usually feature or function indicators that specify the available CTX functions, and also comprise address information. Extensive CTX group data such as the CTX group number plan, by contrast, need not be transmitted.

BRIEF DESCRIPTION OF THE DRAWINGS

The features of the present invention which are believed to be novel, are set forth with particularity in the appended claims. The invention, together with further objects and advantages may best be understood by reference to the following description taken in conjunction with the accompanying drawings, in the several Figures of which like reference numerals identify like elements, and in which:

FIGS. 4A and 4B are flowcharts illustrating the setup of a CTX connection between a calling mobile CTX subscriber and a called and wired CTX subscriber;

DESCRIPTION OF THE PREFERRED EMBODIMENTS

Figure 1:
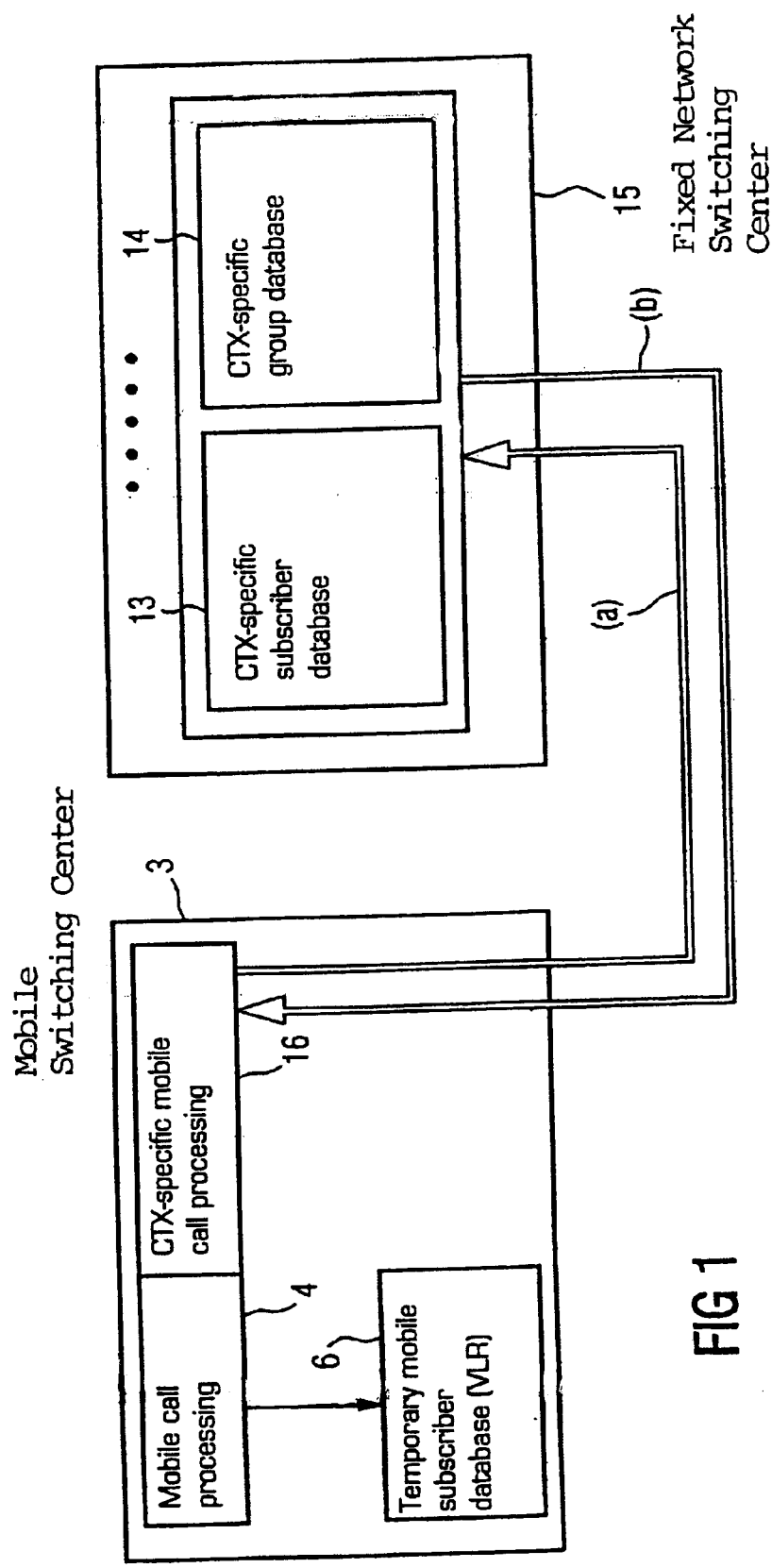
FIG. 1 is a simplified block circuit diagram of an inventive telephone switching center according to a first exemplary embodiment.
Figure 6:
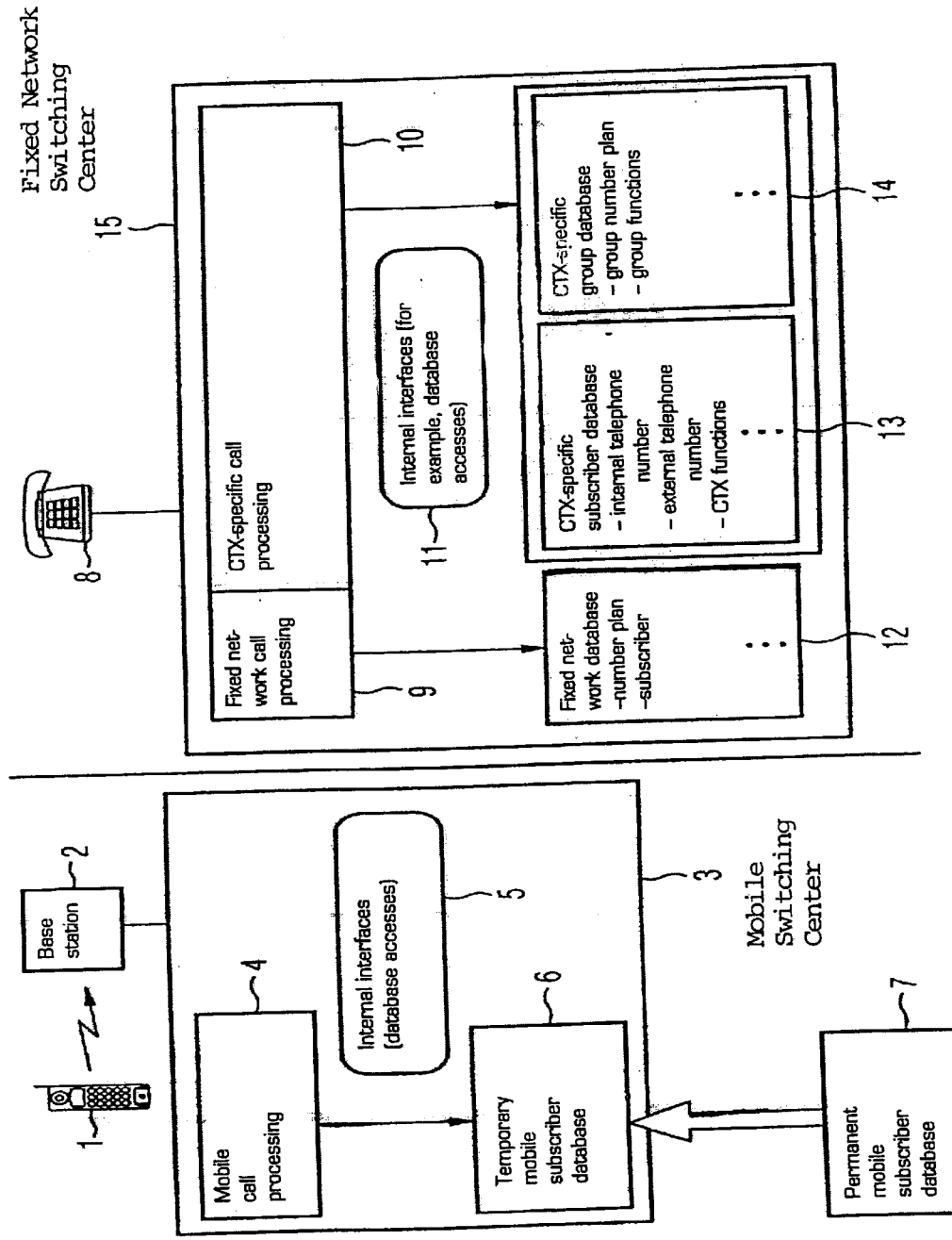
FIG. 6 is a simplified block circuit diagram of a CTX telephone switching system according to the prior art in which mobile subscribers are not linked into the CTX telephone switching system.

At the fixed network side, the telephone switching system shown in FIG. 1 comprises at least one fixed network switching center 15 that is constructed essentially analogous to the fixed network switching center 15 shown in FIG. 6. For the sake of simplicity, only the CTX-specific database is shown in FIG. 1, comprising: 1) a CTX-specific subscriber database 13 in conformity with FIG. 6 and, 2) a CTX-specific group database 14. In view of the structure and functioning of the fixed network switching center 15, the explanations of FIG. 6 will be referenced by way of addition.

FIG. 1 also shows a mobile switching center 3 to which, in agreement with FIG. 6, one or more mobile subscribers are connected via a base station (not shown in FIG. 1). Analogous to the fixed network side, a plurality of mobile switching centers 3 can also be provided at the mobile radio telephone network side. Specific subscribers of the mobile radio telephone network side and of the fixed network side are specified as CTX subscribers and are combined to CTX groups.

According to the present invention, CTX groups can comprise both wired (i.e., stationary) CTX subscribers as well as mobile subscribers. The mobile switching center 3 shown in FIG. 1 comprises a temporary mobile subscriber database formed by the VLR part of the mobile switching center 3 that the controller 4 of the mobile switching center 3 (provided for mobile call processing) accesses. According to the present invention, this controller is expanded by a CTX-specific mobile controller 16 that is provided for, a CTX-specific mobile call processing.

As shown in FIG. 1, a message interface via which CTX-specific information or CTX-specific data can be transmitted is provided between the mobile switching center 3 and the fixed network switching center 15.

Given the exemplary embodiment shown in FIG. 1, the CTX-specific mobile controller of the mobile switching center 3 requests specific CTX-specific data from the fixed network switching center 15 (a) that are subsequently read from the CTX-specific databases 13, 14 of the fixed network switching center 15 and supplied (b) via the message interface to the CTX-specific controller, so that the CTX-specific mobile controller 16—by interaction with the CTX-specific fixed controller 10 (shown in FIG. 6) of the fixed network switching center 15—subsequently switches CTX calls between a mobile CTX subscriber allocated to the corresponding mobile switching center 3 and a further CTX subscriber (mobile or wired). The CTX-specific information requested by the mobile switching center 3 can, for example, be requested and transmitted accompanying the call control or accompanying a location registration for a mobile CTX subscriber.

Figure 2:
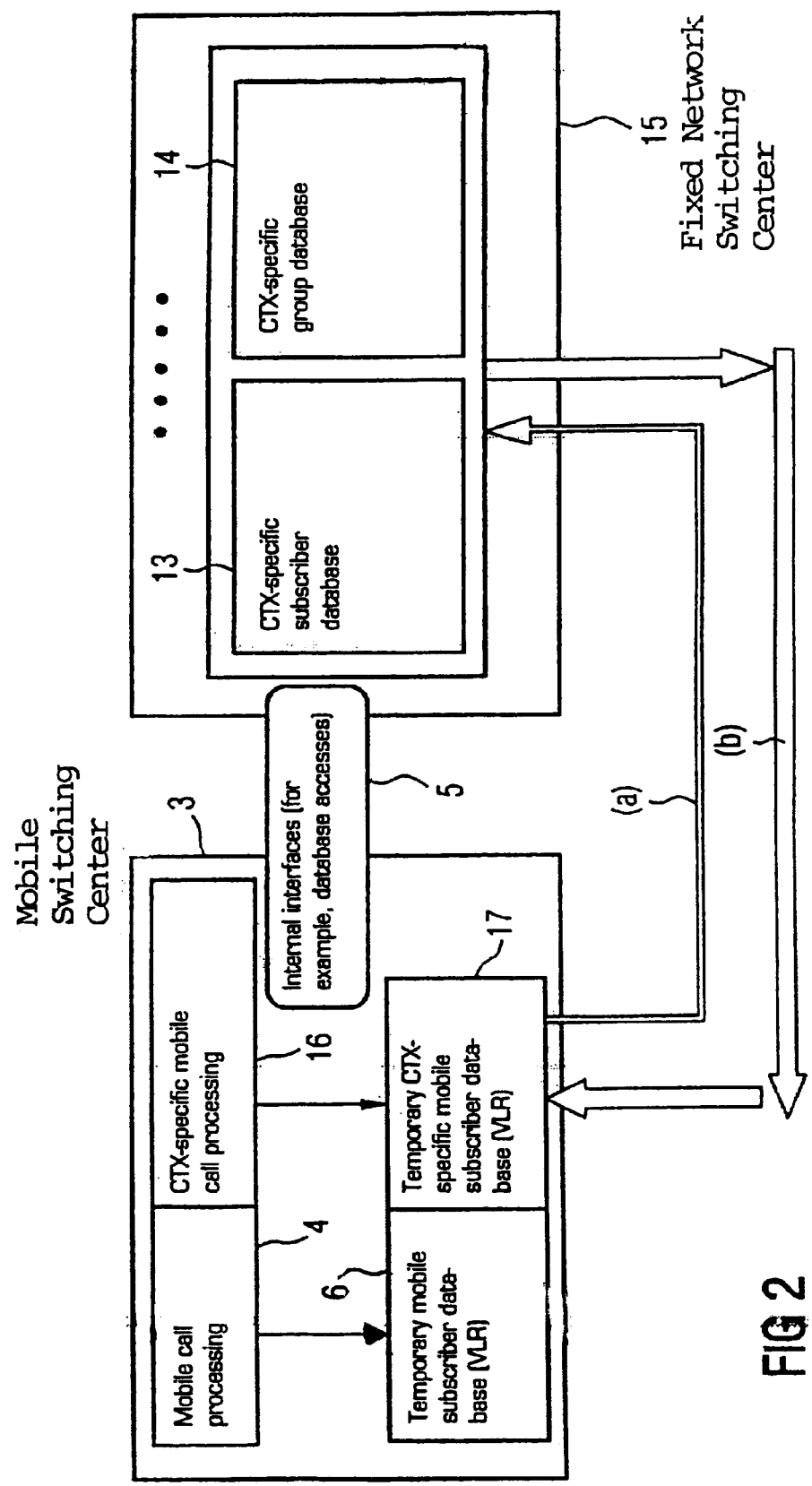
FIG. 2 is a simplified block circuit diagram of an inventive telephone switching system according to a second exemplary embodiment.

The exemplary embodiment of an inventive telephone switching system shown in FIG. 2 essentially corresponds to the telephone switching system shown in FIG. 1 with respect to its functioning, but with the exception that the VLR part 6 of the mobile switching center 3 is supplemented by a possibility of accepting CTX-specific data. A temporary CTX-specific mobile subscriber database 17 is fashioned in the mobile switching center 3, realized, in particular, by the visitor data file (VLR) of the mobile switching center 3. The CTX-specific information requested by the fixed network switching center 15 are intermediately stored in this temporary database 17 so that the CTX-specific mobile controller 16 of the mobile switching center 3 can subsequently access them (via internal interfaces 5).

The acceptance of the CTX-specific information in the temporary CTX-specific mobile subscriber database 17 can ensue accompanying the location registration at a new mobile switching center 3—the CTX-specific data can be stored in the temporary CTX-specific mobile subscriber database 17 when a mobile CTX-subscriber moves into the coverage area of a new mobile switching center 3.

In the exemplary embodiment shown in FIG. 2 (as in the exemplary embodiment shown in FIG. 1) the CTX-request communicated from the mobile switching center 3 to the fixed network switching center 15 can contain identification information about the corresponding CTX subscriber as well as the CTX group allocated to him and call-related information.

The reply communicated from the fixed network switching center 15 to the mobile switching center 3 can contain type of call data and CTX functions available for the corresponding CTX subscriber or, respectively, the CTX group or the type of call. By intermediately storing the CTX-specific information transmitted from the fixed network switching center 15 in the temporary CTX-specific mobile subscriber database 17, the access to the relevant CTX-specific information within the mobile switching center 3 can be accelerated for the subsequent routing of CTX calls.

Figure 3:
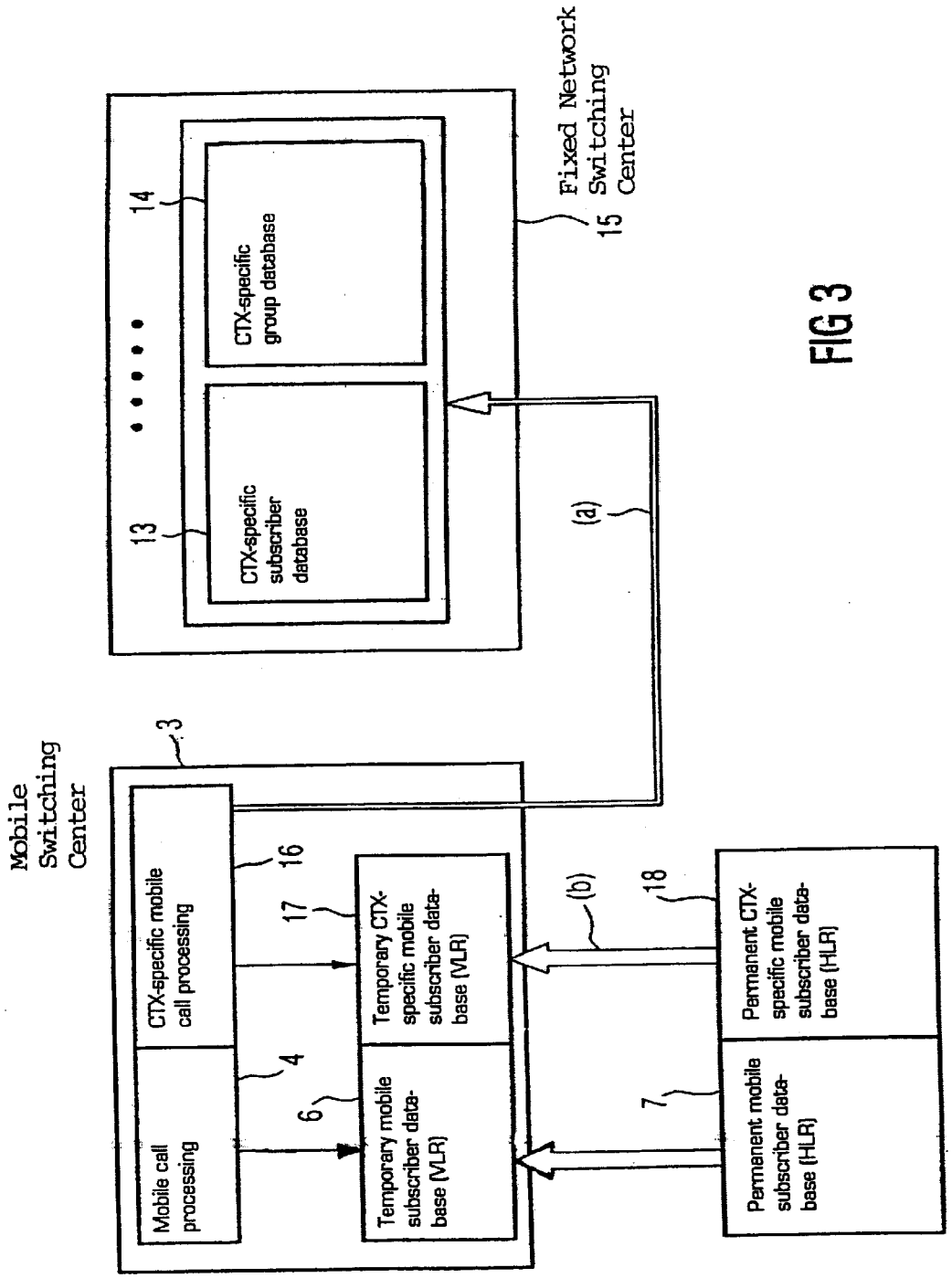
FIG. 3 is a simplified block circuit diagram of an inventive telephone switching system according to a third exemplary embodiment.

Given the exemplary embodiment shown in FIG. 3, the permanent mobile subscriber database 7 of the mobile switching center 3 is supplemented by a part 18 in addition to the mobile switching system shown in FIG. 2, this part permanently storing CTX-specific data that, for example, identify the affiliation of a mobile CTX-subscriber to a CTX-group. Usually, the data of the home data file as well as the data required for the authentication (authentication center AC) are stored in the permanent mobile subscriber database 7. According to the exemplary embodiment shown in FIG. 3, the HLR part 7 of the mobile switching center 3 is supplemented by a CTX-specific part 18 in which, among other things, identification information for the mobile CTX subscribers as well as for the CTX-groups to which the mobile CTX subscriber are assigned are stored.

Furthermore, information about the addresses of the CTX fixed network switching centers 15, etc., are located in the permanent CTX-specific mobile subscriber database 18. The CTX-specific information stored in the CTX-specific permanent database 18 are loaded into the temporary CTX-specific mobile subscriber database (VLR part) 17 accompanying, e.g., the location registration. By accessing the data stored in the temporary CTX-specific mobile subscriber database 17, the CTX-specific mobile controller 16 can then send a CTX message to the fixed network switching center 15 that, for example, can comprise a routing address (i.e., the address of a CTX fixed network switching center) and a database address with the CTX-group identification information and the internal telephone number.

The routing of CTX calls between a mobile CTX subscriber and a stationary (wired) CTX subscriber according to the present invention is explained below with reference to FIG. 4 and FIG. 5, where FIG. 4 shows that case in which a mobile CTX subscriber calls a wired CTX subscriber of the same CTX group, and where FIG. 5 shows that case in which a wired CTX subscriber calls a mobile CTX subscriber of the same CTX group.

As shown in FIG. 4A, the authentication of the mobile subscriber 1 vis-a-vis the corresponding mobile switching center (MSC) 3 ensues, for example, after the mobile telephone device 1 is switched on (Step S1), with the previously mentioned visitor data file (visitor location register VLR) being allocated to it (Step S2). Subsequently, it is assumed that the telephone switching system that is realized is one similar to a system shown in FIG. 2 or FIG. 3, in which the VLR part of the mobile switching center has been supplemented by the possibility of accepting CTX-specific data.

After the authentication, CTX-specific data are subsequently read from the visitor data file according to FIG. 4A (Step S3); these CTX-specific data can comprise, for example, a CTX class marking, a CTX group ID with a CTX business group ID, the telephone number of the calling mobile CTX subscriber and, in particular, a CTX fixed network switching center address. The address of the CTX fixed network switching center references a specific fixed network switching center that is allocated to the mobile subscriber 1. Subsequently, a routing is implemented via the CTX fixed network switching center address that has been read out (Step S4), and, in this way, the previously read CTX-specific data are transmitted to the CTX fixed network switching center 15a indicated by it (subsequently referred to as CTX home exchange).

On the basis of the CTX specific data supplied to the CTX home exchange 15a, the CTX-specific databases 13 and 14 (see FIGS. 1 through 3) of the CTX home exchange 15a are accessed and specific CTX-specific data are again read out (Steps S5 and S6) in order to route CTX-specific call and subscriber data that, among other things, comprise the type of call and the address of the CTX destination exchange 15b corresponding to the called CTX subscriber 8.

During a Step S7, as shown in FIG. 4B, the CTX specific data that have been read out or interpreted are subsequently transmitted from the CTX home exchange 15a back to the mobile switching center 3. These transmitted CTX-specific information contain the previously mentioned information and additionally specify specific CTX functions that are available for the participating subscribers or for the identified type of call (for example, call redirection, etc.). These information are subsequently stored in the temporary CTX-specific mobile subscriber database 17 (i.e., in the visitor data file (VLR)) of the mobile switching center 3. The CTX-specific mobile controller 16 prepares the CTX call in which, e.g., the CTX traffic and the CTX fee schedule to be applied are identified for the call (Step S9).

On the basis of the previously transmitted address of the CTX destination exchange 15b allocated to the called CTX subscriber 8, the CTX destination exchange 15b is subsequently dialed and the information required for the setup of the CTX connection are transmitted (Step S10).

At the side of the CTX destination exchange 15b, the CTX call setup to the dialed, wired CTX subscriber 8 is concluded within the same CTX group (Step S11). A confirmation message is sent back to the mobile switching center 3 (Step S12), this subsequently through-connecting the mobile CTX subscriber 1 (Step S13) or, in case of fault, outputting an error message to the mobile CTX subscriber 1.

Figure 5A:
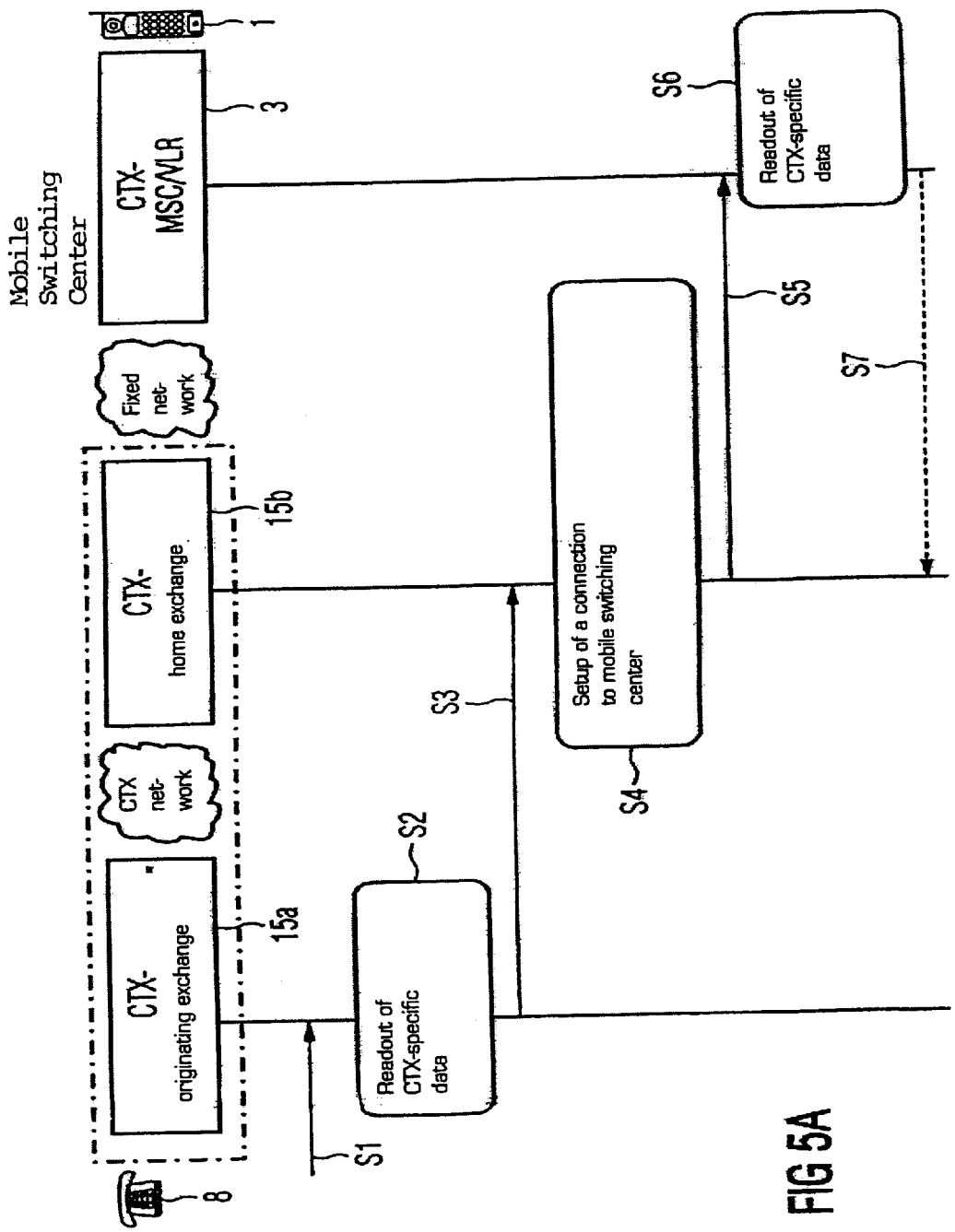
FIGS. 5A and 5B are flowcharts illustrating the setup of a CTX connection between a calling, wired CTX subscriber and a called, mobile CTX subscriber.
Figure 5B:
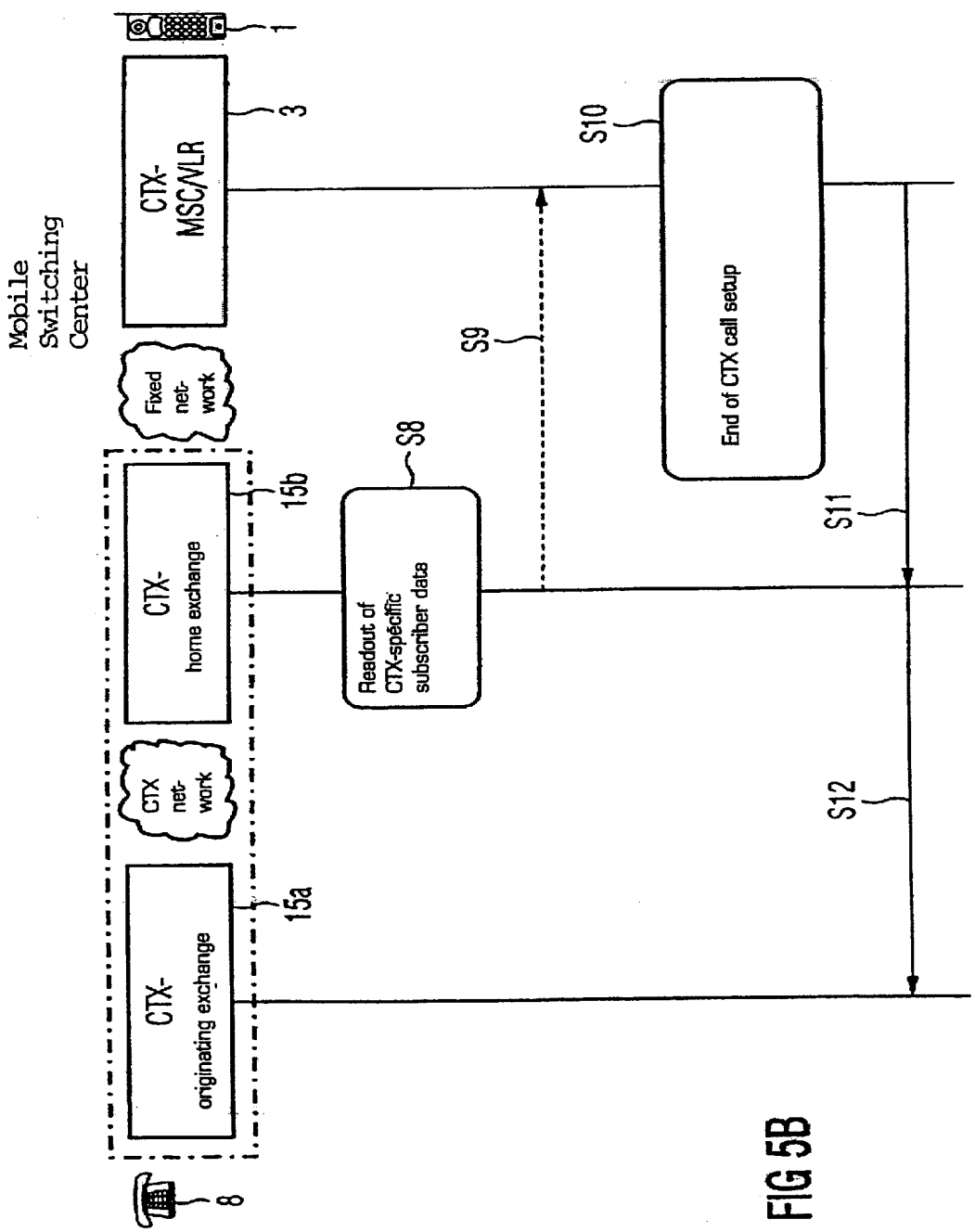

The executive sequence shown in FIGS. 5A and 5B for the call of a mobile CTX subscriber 1 by a wired or stationary CTX subscriber 8 of the same CTX groups essentially corresponds to the executive sequence explained above with reference to FIGS. 4A and 4B, but with an opposite executive sequence direction. After picking up the telephone set and after dialing the telephone number of the desired mobile CTX subscriber at the stationary CTX subscriber terminal equipment 8 (Step S1), CTX-specific information (that, in particular, comprise the type of call, the public telephone number of the desired CTX subscriber, the internal group number of the desired CTX subscriber and the address of the CTX home exchange 15b allocated to the called mobile CTX subscriber 1) are read (Step S2) from the CTX-specific databases of the CTX; originating exchange 15a allocated to the calling CTX subscriber 8, which is formed by a fixed network switching center.

Subsequently, the CTX home exchange 15b, which is specified by the CTX-specific information that have been read out, is selected and the CTX-specific information are transmitted to the CTX home exchange 15b (Step S3). On the basis of the communicated CTX-specific information as well as (potentially) information read out from the CTX-specific databases of the CTX home exchange 15b, the CTX home exchange 15b subsequently sets up a connection to the mobile switching center 3 allocated to the called mobile CTX subscriber 1 (Step S5), and the required CTX-specific information are transmitted. At the side of the mobile switching center 3, the CTX-specific data stored in the visitor data file (VLR) 17 (see FIG. 2 or FIG. 3) are accessed (Step S6) in order to identify the corresponding CTX class marking, the CTX group ID and CTX business group ID, etc., of the called subscriber—these being subsequently transmitted to the CTX home exchange 15b (Step S7).

As shown in FIG. 5B, the corresponding subscriber and group data of the CTX-specific databases 13, 14 (see FIGS.

1 through 3) of the CTX home exchange 15b can be accessed on the basis of the CTX-specific data received from the mobile switching center 3 in order to read these out. The information that are thus present indicate, for example, the CTX functions available for the calling party or called subscriber as well as the type of call. These are transmitted to the mobile switching center 3 (Step S9) that, finally, can setup a mobile radio telephone connection to the called mobile CTX-subscriber 1 (Step S10) and return a corresponding acknowledgment to the CTX home exchange 15b (Step S11). This acknowledgment is handed over to the CTX originating exchange 15b and, thus, to the calling CTX subscriber 8 (Step S12).

What applies both to the executive sequences shown in FIG. 4 as well as in FIG. 5 is that the CTX fixed network switching centers or CTX exchanges 15a and 15b can be formed by one and the same exchange.

The above-described system and method are illustrative of the principles of the present invention. Numerous modifications and adaptations will be readily apparent to those skilled in this art without departing from the spirit and scope of the present inventions.

We claim as our invention:

1. A telephone switching system, comprising:
    a CTX group, having wired CTX subscribers and mobile CTX subscribers, and within which CTX connections can be setup;
    a database for storing CTX-specific data of said wired and mobile CTX subscribers;
    a fixed network switching center to which said wired CTX subscribers are allocated, said fixed network switching center comprising a controller for controlling a setup of a CTX connection via said fixed network switching center between a wired CTX subscriber and another CTX subscriber on the basis of CTX-specific data stored in said database;
    a mobile switching center to which said mobile CTX subscribers are allocated, said mobile switching center comprising a mobile controller for controlling a setup of a CTX connection between a mobile CTX subscriber and said another CTX subscriber; and
    a data interface for the transmission of CTX-specific data between said fixed network switching center and said mobile switching center for setup of a CTX connection, said data interface comprised by elements of said fixed network switching center and said mobile switching center.

2. A telephone switching system according to claim 1, wherein:
    said fixed network switching center comprises a database in which said CTX-specific data of said wired and said mobile CTX subscribers are stored;
    said controller located in said mobile switching center requests said CTX-specific data from said fixed network switching center via said data interfaces for said setup of a CTX connection between said mobile CTX subscriber and said other CTX subscriber; and
    said controller located in said fixed network switching center reads said requested CTX-specific data from said database and transmits said data to said mobile switching center via said data interfaces in order to have said controller located in said mobile switching center set up said CTX connection together with said controller located in said fixed network switching center based on said transmitted CTX-specific data.

3. A telephone switching system according to claim 2, wherein:
    said controller located in said mobile switching center requests CTX-specific data accompanying a location registration of said mobile CTX subscriber from said fixed network switching center via said data interfaces for setting up said CTX connection between said mobile CTX subscriber and said another CTX subscriber.

4. A telephone switching system according to claim 2, wherein:
    said mobile switching center comprises a temporary CTX-specific mobile subscriber database for said transmitted said data within a visitor location register of said mobile switching center; and
    said CTX-specific mobile controller accesses said CTX-specific data stored in said temporary CTX-specific mobile subscriber database for setting up said CTX-connection.

5. A telephone switching system according to claim 1, wherein:
    said database further comprises a CTX-specific database in said fixed network switching center, and a permanent CTX-specific mobile subscriber data base in said mobile switching center;
    said permanent CTX-specific mobile subscriber database store CTX-specific data of said mobile CTX subscribers; and
    said controller located in said mobile switching center accesses said CTX-specific data stored in said permanent CTX-specific mobile subscriber database for setting up said CTX connection between said mobile CTX subscriber and said other CTX subscriber.

6. A telephone switching system according to claim 5, wherein:
    said CTX-specific data stored in said permanent CTX-specific mobile subscriber database comprises information about said CTX groups of mobile CTX subscribers.

7. A telephone switching system according to claim 5, wherein:
    said CTX-specific data stored in said permanent CTX-specific mobile subscriber database comprises information about said fixed network switching center responsible for each said mobile CTX subscriber.

8. A telephone switching system according to claim 5, wherein:
    said permanent CTX-specific mobile subscriber database is created in a home location register of said mobile switching center.

9. A telephone switching system according to claim 5, wherein:
    said mobile switching center comprises a temporary CTX-specific mobile subscriber database for storing CTX-specific data read from said permanent CTX-specific mobile subscriber database; and
    said controller located in said mobile switching center accesses said CTX-specific data stored in said permanent CTX-specific mobile subscriber database and communicates with an appertaining said fixed network switching center via said data interface on the basis of this data.

10. A telephone switching system according to claim 9, wherein:
    said temporary CTX-specific mobile subscriber database are created in a visitor location register of the mobile switching center.

11. A telephone switching system according to claim 1, wherein said database further comprises CTX-specific subscriber information of said individual wired CTX subscribers and said mobile CTX subscribers.

12. A telephone switching system according to claim 1, wherein said database further comprises CTX-specific group information of said CTX group.

13. A method for setting up CTX connections between defined CTX subscribers in a telephone switching system, comprising the steps of:

allocating wired CTX subscribers to a fixed network switching center, said fixed network switching center comprising a controller for controlling the setup of a CTX connection via said fixed network switching center between a wired CTX subscriber and another CTX subscriber on the basis of CTX-specific data stored in a database;

allocating mobile CTX subscribers to a mobile switching center, said mobile switching center comprising a controller for controlling the setup of a CTX connection between a mobile CTX subscriber and another CTX subscriber;

storing CTX-specific data of said mobile CTX subscribers and of said wired CTX subscribers in a CTX-specific database of said fixed network switching center;

requesting said CTX-specific data by said CTX-specific mobile controller of said mobile switching center from said fixed network switching center via a data interface comprised by elements of said fixed network switching center and said mobile switching center;

responding to said request of said CTX-specific mobile controller, by said controller located in said fixed network switching center;

reading said requested CTX-specific data from said CTX-specific database;

transmitting said requested CTX-specific data to said mobile switching center via said data interface; and utilizing said transmitted CTX-specific data by said controller located in said mobile switching center together with said controller located in said fixed network switching center for setting up said CTX connections.

14. The method for setting up CTX connections of claim 13, further comprising the step of:

requesting CTX-specific data accompanying a location registration of said mobile CTX subscriber from said fixed network switching center via said data interfaces, by said controller located in said mobile switching center.

15. The method for setting up CTX connections of claim 13, further comprising the steps of:

storing said transmitted requested CTX-specific data in a temporary CTX-specific mobile subscriber database of said mobile switching center; and accessing said stored data in said temporary mobile subscriber database by said controller located in said mobile switching center for setting up said CTX connections.

16. The method for setting up CTX connections of claim 15, further comprising the step of:

creating said temporary CTX-specific mobile subscriber database in a visitor location register of said mobile switching center.

17. The method for setting up CTX connections of claim 13, further comprising the steps of:

storing CTX-specific data for said mobile CTX subscribers in a permanent CTX-specific mobile subscriber database of said mobile switching center;

accessing said stored CTX-specific data in said permanent CTX-specific mobile subscriber database by said controller located in said mobile switching center for setting up a CTX connection between said mobile CTX subscriber and another CTX subscriber; and communicating with an appertaining fixed network switching center via said data interface based on said accessed CTX-specific data.

18. The method for setting up CTX connections of claim 17, wherein said CTX-specific data stored in said permanent CTX-specific mobile subscriber database further comprises information about said CTX groups of said mobile CTX subscribers.

19. The method for setting up CTX connections of claim 17, wherein said CTX-specific data stored in said permanent CTX-specific mobile subscriber database further comprises information about said fixed network switching center responsible for each said mobile subscriber.

20. The method for setting up CTX connections of claim 17, further comprising the step of:

creating said permanent CTX-specific mobile subscriber database in a home location register of said mobile switching center.

21. The method for setting up CTX connections of claim 17, further comprising the steps of:

storing data read from said permanent CTX-specific mobile subscriber database in a temporary CTX-specific mobile subscriber database by said mobile switching center;

accessing said stored data in said temporary CTX-specific database by said CTX-specific mobile controller; and utilizing said accessed data for setting up a CTX connection between said mobile CTX subscriber and another CTX subscriber.

22. The method for setting up CTX connections of claim 21, further comprising the step of:

creating said temporary CTX-specific database in a visitor location register of said mobile switching center.

23. A telephone switching system, comprising:

a CTX group, having wired CTX subscribers and mobile CTX subscribers, and within which CTX connections can be setup;

a fixed network switching center to which said wired CTX subscribers are allocated, said fixed network switching center comprising a database for storing CTX-specific data of said wired and mobile CTX subscribers, and further comprising a controller for controlling a setup of a CTX connection via said fixed network switching center between a wired CTX subscriber and another CTX subscriber on the basis of CTX-specific data stored in said database; and a mobile switching center to which said mobile CTX subscribers are allocated, said mobile switching center comprising a mobile controller for controlling a setup of a CTX connection between a mobile CTX subscriber and said another CTX subscriber by requesting said CTX-specific data from said fixed network switching center and storing said data in a visitor location register of said mobile switching center.

* * * * *